US012684590B2

(12) United States Patent
Wu

(10) Patent No.: US 12,684,590 B2
(45) Date of Patent: Jul. 14, 2026

(54) WIRELESS COMMUNICATION METHOD, FIRST DEVICE, AND SECOND DEVICE

(71) Applicant: GUANGDONG OPPO MOBILE TELECOMMUNICATIONS CORP., LTD., Dongguan (CN)

(72) Inventor: Zuomin Wu, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 370 days.

(21) Appl. No.: 18/476,705

(22) Filed: Sep. 28, 2023

(65) Prior Publication Data

US 2024/0023136 A1     Jan. 18, 2024

Related U.S. Application Data

(63) Continuation of application No. PCT/CN2021/085429, filed on Apr. 2, 2021.

(51) Int. Cl.
H04W 72/232          (2023.01)

(52) U.S. Cl.
CPC ................................. H04W 72/232 (2023.01)

(58) Field of Classification Search
CPC .................................................... H04W 72/232
USPC ......................................................... 370/329
See application file for complete search history.

(56) References Cited

U.S. PATENT DOCUMENTS

2020/0374055 A1* 11/2020 Baldemair ............ H04L 5/0053

FOREIGN PATENT DOCUMENTS

| CN | 110740512 A | 1/2020 |
|----|-------------|--------|
| CN | 111918397 A | 11/2020 |
| CN | 112512008 A | 3/2021 |
| WO | 2021024184 A1 | 2/2021 |
| WO | 2022205465 A1 | 10/2022 |

OTHER PUBLICATIONS

Moderator (Lenovo): Feature lead summary#2 for [104-e-NR-52-71GHZ-02] on PDCCH monitoring enhancements, R1-2102142, dated Feb. 4, 2021 (100 pages).
European Search Report from the corresponding European Patent Application No. 21934121.1, mailed Apr. 25, 2024.
3rd Generation Partnership Project;Technical Specification Group Services and System Aspects;Vocabulary for 3GPP Specifications (Release 16), 3GPP TR 21.905 V16.0.0 (Jun. 2019).

(Continued)

*Primary Examiner* — Peter G Solinsky

(74) *Attorney, Agent, or Firm* — Ladas & Parry, LLP

(57)          ABSTRACT

A wireless communication method, a first device, and a second device are provided. The method comprises: listening to, by a first device, control-channel candidates based on a first capability; wherein the first capability comprises the maximum value of the number of the control-channel candidates listened to on a service cell and/or the maximum value of the number of non-overlapping control-channel elements (CCE)s, the first capability is defined based on a first time domain element and/or a first subcarrier spacing, and the first time domain element has a length greater than a length of a time slot corresponding to the first subcarrier spacing.

20 Claims, 5 Drawing Sheets

300

Second device                                                   First device

S310,transmitting configuration information, wherein the configuration information is configured to configure at least one of: the number of first time elements in the first time domain element, a first subcarrier spacing corresponding to the first time domain element, a starting position of the first time domain element, a second subcarrier corresponding to the first time elements, the number of second time elements in a first listening timing in the first time domain element, a starting position of the first listening timing, and a third subcarrier spacing corresponding to the second time elements; wherein the first time domain element and/or the first subcarrier spacing is configured to define a first capability, and the first capability comprises the maximum value of the number of control-channel candidates listened to on a service cell and/or the maximum value of the number of non-overlapping CCEs

(56) References Cited

OTHER PUBLICATIONS

"Discussion summary # 4 of [104-e-NR-52-71GHZ-04]," 3GPP TSG RAN WG1 #104-e, R1-2102144, e-Meeting, Jan. 25-Feb. 5, 2021, all pages.

Vivo, "Discussions on PDCCH monitoring enhancements for NR operation from 52.6-71GHz",3GPP TSG RAN /WG1 #104-e /Docs, R1-2100430;e-Meeting, Jan. 25-Feb. 5, Jan. 2021 (Jan. 18, 2021), all pages.

International Search Report for International Application No. PCT/CN2021/085429, mailed Dec. 24, 2021.

Written Opinion of International Searching Authority in International Application No. PCT/CN2021/085429, mailed Dec. 24, 2021, with partial translation by the applicant's foreign counsel and machine English translation provided by WIPO.

* cited by examiner

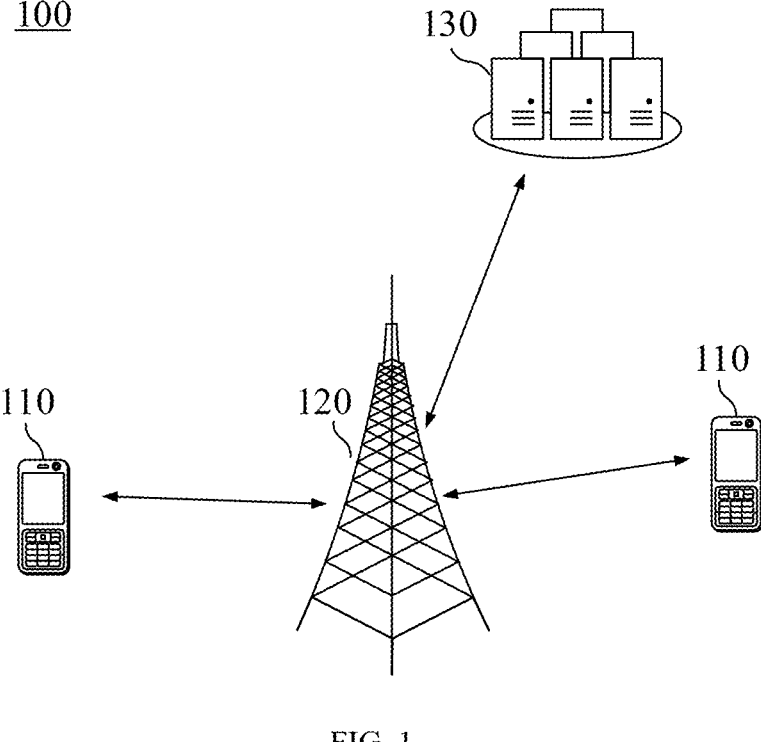

200 a first device listening to control-channel candidates based on a first capability; wherein the first capability comprises the maximum value of the number of the control-channel candidates listened to on a service cell and/or the maximum value of the number of non-overlapping control-channel elements (CCE)s listened to on the service cell, the first capability is defined based on a first time domain element and/or a first subcarrier spacing, the first time domain element having a length greater than a length of a time slot corresponding to the first subcarrier spacing

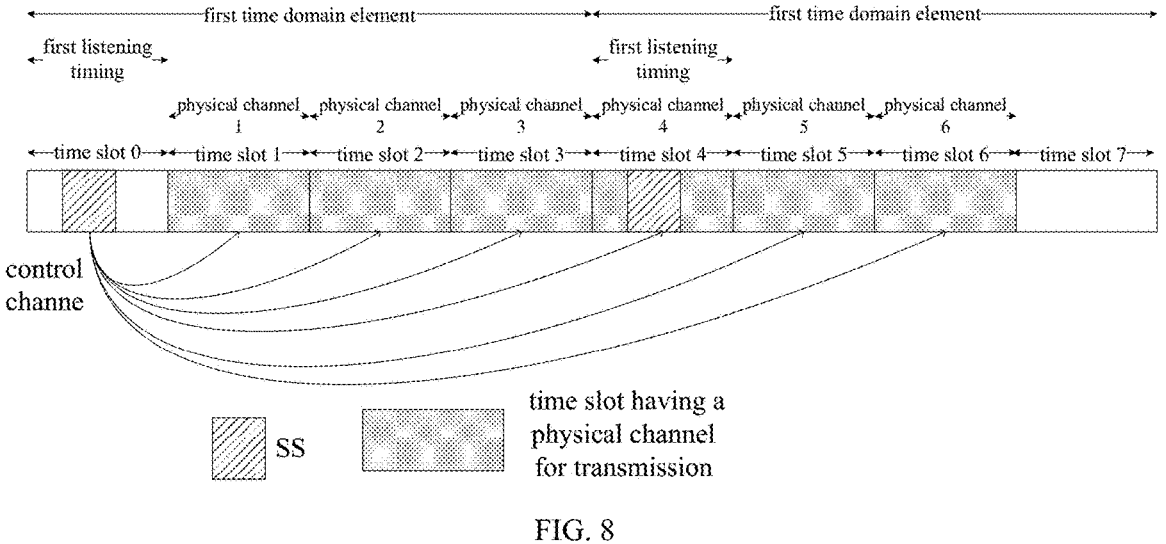

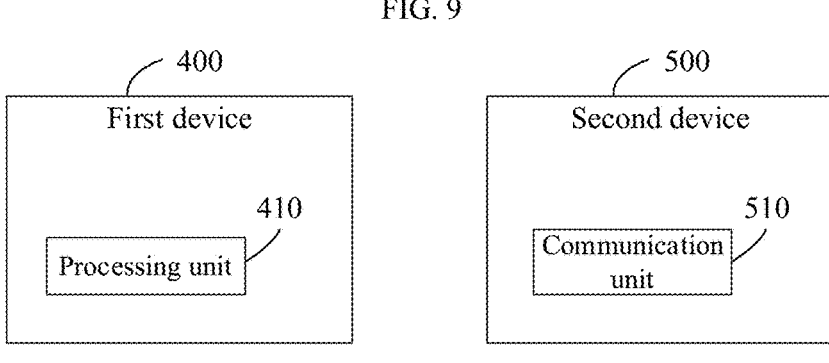

S310, transmitting configuration information, wherein the configuration information is configured to configure at least one of: the number of first time elements in the first time domain element, a first subcarrier spacing corresponding to the first time domain element, a starting position of the first time domain element, a second subcarrier corresponding to the first time elements, the number of second time elements in a first listening timing in the first time domain element, a starting position of the first listening timing, and a third subcarrier spacing corresponding to the second time elements; wherein the first time domain element and/or the first subcarrier spacing is configured to define a first capability, and the first capability comprises the maximum value of the number of control-channel candidates listened to on a service cell and/or the maximum value of the number of non-overlapping CCEs

WIRELESS COMMUNICATION METHOD, FIRST DEVICE, AND SECOND DEVICE

CROSS REFERENCE TO RELATED APPLICATIONS

The present disclosure is a continuation application of International (PCT) Patent Application No. PCT/CN2021/085429 filed on Apr. 2, 2021, the entire disclosure of which is hereby incorporated by reference in its entirety.

TECHNICAL FIELD

Embodiments of the present disclosure relate to a field of communications, and more specifically relate to a wireless communication method, a first device, and a second device.

BACKGROUND

In high frequency systems, a time length occupied by each time element is shorter due to greater subcarrier spacings. When a manner of defining detection capabilities of terminal devices based on each time element or each span combination (X, Y) in an existing system is followed, each time element of the terminal devices is required to estimate channels in a CORESET and listen to PDCCH candidates, which requires high processing capabilities of the terminal devices. Therefore, the related art urgently requires a wireless communication method to reduce requirements for the processing capabilities of the terminal devices and enhance capability definitions of the terminal devices.

SUMMARY OF THE DISCLOSURE

A wireless communication method, a first device, and a second device are provided in the embodiments of the present disclosure.

According to a first aspect, a wireless communication method is provided in the present disclosure and includes listening to, by a first device, control-channel candidates based on a first capability; wherein the first capability comprises the maximum value of the number of the control-channel candidates listened to on a service cell and/or the maximum value of the number of non-overlapping control-channel elements (CCE)s, the first capability is defined based on a first time domain element and/or a first subcarrier spacing, and the first time domain element has a length greater than a length of a time slot corresponding to the first subcarrier spacing.

According to a second aspect, a first device is provided and includes a processor and a memory. The memory is configured to store a computer program, and the processor is configured to call and run the computer program stored in the memory to implement the method of the first aspect described above or various implementations of the first aspect.

According to a third aspect, a second device is provided and includes a processor and a memory. The memory is configured to store a computer program, and the processor is configured to call and run the computer program stored in the memory to implement transmitting configuration information, wherein the configuration information is configured to configure at least one of: the number of first time elements in the first time domain element, a first subcarrier spacing corresponding to the first time domain element, a starting position of the first time domain element, a second subcarrier spacing corresponding to the first time elements, the number of second time elements in a first listening timing in the first time domain element, a starting position of the first listening timing, and a third subcarrier spacing corresponding to the second time elements; wherein the first time domain element and/or the first subcarrier spacing is configured to define a first capability, and the first capability comprises the maximum value of the number of control-channel candidates listened to on a service cell and/or the maximum value of the number of non-overlapping control-channel elements (CCE)s.

BRIEF DESCRIPTION OF THE DRAWINGS

FIG. 1 is a schematic diagram of an example of a communication system according to some embodiments of the present disclosure.

FIG. 2 is a schematic flowchart of a wireless communication method according to some embodiments of the present disclosure.

FIG. 8 is a sixth example of the time domain element according to some embodiments of the present disclosure.

FIG. 9 is another schematic flowchart of the wireless communication method according to some embodiments of the present disclosure.

FIG. 10 is a schematic block view of a first device according to some embodiments of the present disclosure.

FIG. 11 is a schematic block view of a second device according to some embodiments of the present disclosure.

DETAILED DESCRIPTION

Figures 3, 4, 5:
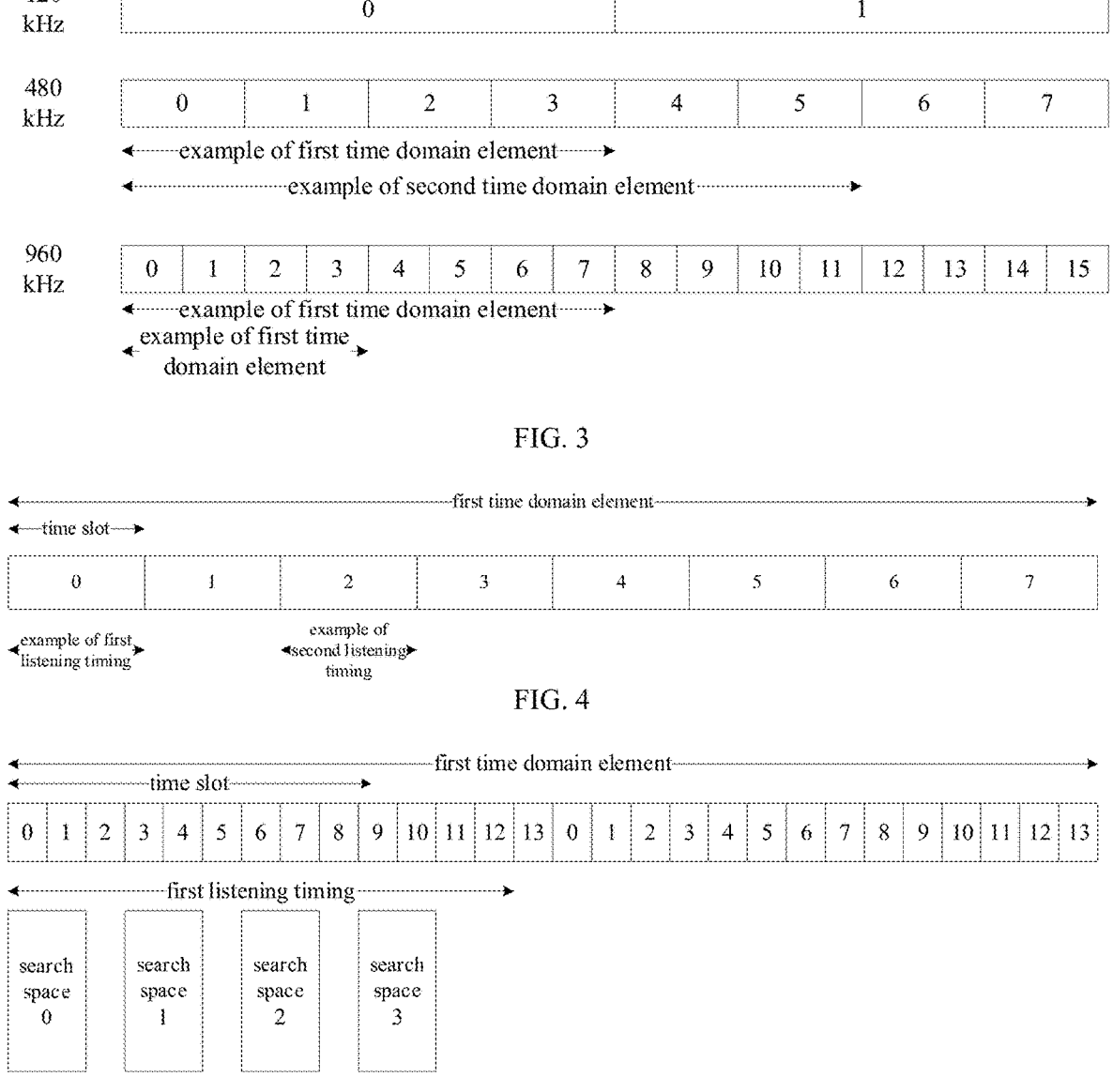
FIG. 3 is a first example of a time domain element according to some embodiments of the present disclosure.
FIG. 4 is a second example of the time domain element according to some embodiments of the present disclosure.
FIG. 5 is a third example of the time domain element according to some embodiments of the present disclosure.

Technical schemes of the embodiments of the present disclosure will be described below in conjunction with accompanying drawings in the embodiments of the present disclosure. Apparently, described embodiments are a part but not all of the embodiments of the present disclosure. Other embodiments obtained by one of ordinary skill in the related art based on the embodiments of the present disclosure without creative labor shall all fall into the scope of the present disclosure.

FIG. 1 is a schematic diagram of an example of a communication system according to some embodiments of the present disclosure.

As shown in FIG. 1, a communication system 100 may include a terminal device 110 and a network device 120. The network device 120 may communicate with the terminal device 110 through radio. A multi-business transmission is supported between the terminal device 110 and the network device 120.

It should be understood that the communication system 100 is only taken as an example for illustration in the embodiments of the present disclosure, while the embodiments of the present disclosure are not limited thereto. That is, the technical schemes of the embodiments of the present disclosures may be applied to or performed in various communication systems, such as a Long Term Evolution (LTE) system, a LTE Time Division Duplex (TDD), a Universal Mobile Telecommunication System (UMTS), an Internet of Things (IoT) system, a Narrow Band Internet of Things (NB-IoT) system, an enhanced Machine-Type Communications (eMTC) system, a 5G communication system (also known as a New Radio (NR) communication system), or a future communication system, or the like.

In the communication system 100 shown in FIG. 1, the network device 120 may be an access network device communicating with the terminal device 110. The access network device may provide a communication coverage for a specific geographic area and may communicate with the terminal device 110 (e.g., a User Equipment (UE)) located within a region with the communication coverage.

The network device 120 may be an Evolutional Node B (eNB or eNodeB) in the LTE system, or a Next Generation Radio Access Network (NG RAN) device, or a base station (gNB) in a NR system, or a wireless controller in a Cloud Radio Access Network (CRAN). Alternatively, the network device 120 may be a repeater station, an access point, an in-vehicle device, a wearable device, a hub, an exchange, a bridge, a router, or a network device in a further evolved Public Land Mobile Network (PLMN), etc.

The terminal device 110 may be any terminal device, which includes but is not limited to, a terminal device being wiredly or wirelessly connected to the network device 120 or other terminal devices.

For example, the terminal device 110 may refer to an access terminal, the UE, a user unit, a user station, a mobile station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a IoT device, a satellite handheld terminal, a Wireless Local Loop (WLL) station, a Personal Digital Assistant (PDA), a handheld device with a wireless communication capability, a computing device, or other processing devices connected to a wireless modem, the in-vehicle device, the wearable device, a terminal device in a 5G network, or a terminal device in a future evolved network, or the like.

The terminal device 110 may be configured for a device-to-device (D2D) communication.

The wireless communication system 100 may also include a core network device 130 communicating with the base station. The core network device 130 may be a 5G Core (5GC) network device, e.g., Access and Mobility Management Function (AMF), or e.g., Authentication Server Function (Authentication Server Function (AUSF), or e.g., User Plane Function (UPF), or e.g., Session Management Function (SMF). Alternatively, the core network device 130 may also be an Evolved Packet Core (EPC) device of a LTE network, e.g., a SMF+ Core Packet Gateway (PGW-C) (SMF+PGW-C) device. It should be understood that the SMF+PGW-C may implement both a function implemented by the SMF and a function implemented by the PGW-C at the same time. In a process of the network evolving, the core network device mentioned above may also be referred to as other names or form new network entities through a division for functions of a core network, which is not limited in the embodiments of the present disclosure.

Connections may be established among various functional units in the communication system 100 through Next Generation (NG) network interfaces to implement communications.

For example, the terminal device establishes a radio connection with the access network device through a NR interface to transmit user plane data and a control plane signaling. The terminal device may establish a control plane signaling connection with the AMF through a NG interface 1 (N1 for short). The access network device, such as a NG radio access base station (gNB), may establish a user plane data connection with the UPF through a NG interface 3 (N3 for short). The access network device may establish the control plane signaling connection with the AMF through a NG interface 2 (N2 for short). The UPF may establish the control plane signaling connection with the SMF through a NG interface 4 (N4 for short). The UPF may interact the user plane data with a data network through a NG interface 6 (N6 for short). The AMF may establish the control plane signaling connection with the SMF through a NG interface 11 (N11 for short). The SMF may establish the control plane signaling connection with a PCF through a NG interface 7 (N7 for short).

FIG. 1 exemplarily illustrates a base station, a core network device, and two terminal devices. In an embodiment, the wireless communication system 100 may include multiple base station devices and a coverage scope of each base station may include other numbers of terminal devices, which is not limited in the embodiments of the present disclosure.

It should be understood that a device having a communication function in a network/system in the embodiments of the present disclosure may be referred to as a communication device. The communication system 100 shown in FIG. 1 is taken as an example. Communication devices may include the network device 120 and the terminal device 110 having communication functions. The network device 120 and terminal device 110 may be devices described above, which is not repeated herein. The communication devices may also include other devices in the communication system 100, such as other network entities, e.g., a network controller, a mobile management entity, or the like, which is not limited in the embodiments of the present disclosure.

It should be understood that the term "system" and the term "network" may often be used interchangeably herein. The term "and/or" herein is only a description of an association relationship between associated objects, which indicates three relationships may exist therein. For example, A and/or B, may indicate the following three cases: A alone, both A and B, and B alone. In addition, the character "/" herein generally indicates that the associated objects before and after the character "/" have an "or" relationship.

It should also be understood that the term "indication" in the present disclosure may be a direct indication, or an indirect indication, or an indication of an associated relationship. For example, A indicates B, may mean that A directly indicates B, for example, B may be acquired through A; or A indirectly indicates B, for example, A indicates C, and B may be acquired through C; or A and B have an associated relationship. The term "corresponding" mentioned in the embodiments of the present disclosure may indicate a direct corresponding or indirect corresponding relationship between two objects, or may also indicate the two objects have the associated relationship, or may be an indicating-and-indicated relationship or a configuring-and-configured relationship. It also should be understood that the term "predefined" or the term "predefined rule" mentioned in the embodiments of the present disclosure may be implement through pre-storing a corresponding code or excel in the device (e.g., including the terminal device and the network device) or other manners capable of indicating associated information. No limitation is made to specific implementation manners in the present disclosure. For example, the term "predefined" may indicate a definition in a protocol. It should also be understood that the "protocol" in the embodiments of the present disclosure may refer to a standard protocol in the field of communications. For example, the "protocol" may include a LTE protocol, a NR protocol, and a relevant protocol applied in the future communication system, which is not limited in the present disclosure.

For ease of understanding the schemes of the present disclosure, high-frequency relevant contents are illustrated in the following.

Two frequency bands are primarily considered in studies for the NR system, i.e., a frequency range 1 (FR1) and a frequency range 2 (FR2). Frequency domain ranges included in the FR1 and FR2 are illustrated exemplarily with reference to Table 1 below.

TABLE 1

| Frequency definition | corresponding frequency band range |
| --- | --- |
| FR1 | 410 MHz~7.125 GHz |
| FR2 | 24.25 GHz~52.6 GHz |

As shown in Table 1, FR1 may have a frequency domain range of 410 MHz~7.125 GHz, and FR2 may have a frequency domain range of 24.25 GHz~52.6 GHz.

As the NR system evolves, technologies in a new frequency band, i.e., a high frequency band, also begins to be studied. A frequency domain range of the new frequency band is as shown in Table 2 and is indicated with FRX for convenience of description. Understandably, this frequency band name should not constitute any limitation. For example, FRX may be FR3.

TABLE 2

| Frequency definition | corresponding frequency band range |
| --- | --- |
| FRX | 52.6 GHz~71 GHz |

As shown in FIG. 2, the frequency domain range of the FRX may be 52.6 GHz~71 GHz.

A FRX frequency band includes a licensed spectrum and an unlicensed spectrum. In other words, the FRX frequency band includes a non-shared spectrum and a shared spectrum.

The unlicensed spectrum is a spectrum configured for the radio device communication, which is divided by countries and regions. The unlicensed spectrum is usually considered to be the shared spectrum. That is, communication devices in different communication systems may employ this spectrum as long as regulatory requirements set by the countries or regions on this spectrum are satisfied, without a need to apply an exclusive spectrum authorization to governments.

In order to allow various wireless communication systems employing the unlicensed spectrum for wireless communication to coexist amicably on this spectrum, some countries or regions have stipulated the regulatory requirements which must be satisfied to employ the unlicensed spectrum. For example, the communication devices follow a "listen-before-talk (LBT)" principle. That is, the communication devices are required to listen to the channels before transmitting signals on the channels of the unauthorized spectrum. Only when a channel listening result is a channel being idle, can the communication device transmit a signal. When the channel listening result of the communication device on the channels of unlicensed spectrum is the channel being busy, the communication cannot transmit the signal. For another example, in order to ensure fairness, a duration of the communication device performing a signal transmission through the channel of the unlicensed spectrum cannot be greater than a specific time length in one transmission. For a yet example, in order to avoid that an excessively great power of the signal transmitted on the channel of the unlicensed spectrum affects transmission of other important signals on this channel, the communication device is required to follow a limitation of being less than or equal to the maximum power spectral density while performing the signal transmission through the channel of the unlicensed spectrum.

The subcarrier spacing considered for the FRX frequency band may be greater than that of the FR2. Current candidate subcarrier spacings include at least one of: 240 kHz, 480 kHz, and 960 kHz. As an example, parameter sets (Numerology) corresponding to these candidate subcarrier spacings are shown in Table 3 below.

TABLE 3

| Subcarrier spacing | Symbol length | NCP length | ECP length | Symbol band NCP length | Time slot length |
| --- | --- | --- | --- | --- | --- |
| 240 kHz | 4.16 μs | 0.292 μs | 1.04 μs | 4.452 μs | 62.5 μs |
| 480 kHz | 2.08 μs | 0.146 μs | 0.52 μs | 2.226 μs | 31.25 μs |
| 960 kHz | 1.04 μs | 0.073 μs | 0.26 μs | 1.113 μs | 15.625 μs |

As shown in Table 3, each subcarrier spacing correspondingly includes parameters: a symbol length, a NCP length, a ECP length, a symbol band NCP length, and a time slot length.

For ease of understanding the schemes provided in the present disclosure, a Control-resource set and a search space in the NR system are illustrated in the following.

In the NR system, a resource set configured to transmit a PDCCH is referred to as the control-resource set (CORESET). One CORESET may include $N_{RB}$ RBs in the frequency domain and $N_{symb}$ symbols in a time domain. Furthermore, the time domain resource $N_{symb}$ is configured by the network device through a high layer parameter such as duration, and has a value range of 1~3. The frequency domain resource $N_{RB}$ is also configured by the network device through the high layer parameter such as frequencyDomainResources. In an embodiment, a configuration manner may be bit mapping.

The terminal device may be configured with one or more CORESETs. Each of the CORESETs may include at least one control-channel element (CCE). In an embodiment, one CCE may 6 resource-element groups (REGs). one REG includes a RB corresponding to a symbol. In the CORESET, the REGs are numbered in a manner of first the time domain and then the frequency domain.

The terminal device may be configured with multiple Search Space (SS) sets. One search space set is associated with one CORESET, and one CORESET may be associated with one or more SS sets. One SS set includes one or more CCE. The terminal device may listen to the PDCCH candidates on the one or more CCEs of the SS set.

One PDCCH may be mapped to one or more CCEs, or in other words, one PDCCH includes one or more CCEs. The number of the CCEs is also referred to be an aggregation level (AL). Currently, aggregation levels supported in a protocol include 1, 2, 4, 8, and 16.

A PDCCH listening timing in the NR system is illustrated in the following.

The terminal device listens for the PDCCH candidates in a defined PDCCH SS set. One SS set may be a Common Search Space (CSS) set or a UE-specific Search Space (USS) set. The SS sets listened to by the terminal device include one or more of the following SS sets:

Type0-PDCCH CSS set: The PDCCH transmitted in the Type0-PDCCH CSS set is configured to schedule a PDSCH carrying a SIB1, this SS set is indicated through a pdcch-ConfigSIB1 information field in MIB information, or is configured through a RRC signaling such as searchSpac-eSIB1 or searchSpaceZero in PDCCH-ConfigCommon. A CRC in a DCI format is scrambled through SI-RNTI.

Type0A-PDCCH CSS set: The PDCCH transmitted in the Type0A-PDCCH CSS set is configured to schedule the PDSCH carrying OtherSystemInformation. This SS set is configured through the RRC signaling such as searchSpa-ceOtherSystemInformation in the PDCCH-ConfigCommon. The CRC in the DCI format is scrambled through the SI-RNTI.

Type1-PDCCH CSS set: The PDCCH transmitted in the Type1-PDCCH CSS set is configured to schedule the PDSCH carrying RAR. This SS set is configured by the RRC signaling such as ra-SearchSpace in the PDCCH-ConfigCommon. The CRC in the DCI format is scrambled through RA-RNTI, MsgB-RNTI, or TC-RNTI.

Type2-PDCCH CSS set: The PDCCH transmitted in the Type2-PDCCH CSS set is configured to schedule the PDSCH carrying a paging message. This SS set is config-ured by the RRC signaling such as pagingSearchSpace in the PDCCH-ConfigCommon. The CRC in the DCI format is scrambled through P-RNTI.

Type3-PDCCH CSS collection: The PDCCH transmitted in Type3-PDCCH CSS set is a Group Common (GC) PDCCH. This SS set is configured through the RRC signal-ing such as SearchSpace in PDCCH-Config and a type of this SS set is configured to be common. The CRC in the DCI format is scrambled through INT-RNTI, SFI-RNTI, TPC-PUSCH-RNTI, TPC-PUCCH-RNTI, TPC-SRS-RNTI, or CI-RNTI. Moreover, for a primary cell, C-RNTI, MC S-C-RNTI, CS-RNTI(s), or PS-RNTI may also be configured for scrambling.

USS set: The PDCCH transmitted in the USS set is a specific PDCCH of the terminal device. This SS set is configured through the RRC signaling such as SearchSpace in the PDCCH-Config and the type of this SS set is config-ured to be ue-Specific. The CRC in the DCI format is scrambled through C-RNTI, MCS-C-RNTI, SP-CSI-RNTI, CS-RNTI(s), SL-RNTI, SL-CS-RNTI, or SL Semi-Persis-tent Scheduling V-RNTI.

In an initial access phase, the terminal device has not yet established an RRC connection with the network device. The terminal device is not configured with a user-specific control channel, but is required to receive public control information in a cell through a common control channel on an initial downlink BWP to complete a subsequent initial access process. The terminal device receives the common control channel through the common search space (CSS) set. The CSS set is configured through a system message or the RRC signaling. CSS sets associated with the initial access primarily include the following:

Type0-PDCCH CSS set: The PDCCH transmitted in the Type0-PDCCH CSS set is configured to schedule the PDSCH carrying SIB1. This SS set is indicated through the pdcch-ConfigSIB1 information field in a MIB message, or is configured through the RRC signaling such as searchSpac-eSIB1 or searchSpaceZero in the PDCCH-ConfigCommon. The CRC in the DCI format is scrambled through the SI-RNTI.

Type0A-PDCCH CSS set: The PDCCH transmitted in the Type0A-PDCCH CSS set is configured to schedule the PDSCH carrying OtherSystemInformation. This SS set is configured through the RRC signaling such as searchSpa-ceOtherSystemInformation in the PDCCH-ConfigCommon. The CRC in the DCI format is scrambled through the SI-RNTI.

Type1-PDCCH CSS set: The PDCCH transmitted in the Type1-PDCCH CSS set is configured to schedule the PDSCH carrying the RAR. The SS set is configured through the RRC signaling such as ra-SearchSpace in the PDCCH-ConfigCommon. The CRC in the DCI format is scrambled through the RA-RNTI, the MsgB-RNTI, or the TC-RNTI.

Type2-PDCCH CSS set: The PDCCH transmitted in the Type2-PDCCH CSS set is configured to schedule the PDSCH carrying the paging message. This SS set is con-figured through the RRC signaling such as the paging-SearchSpace in the PDCCH-ConfigCommon. The CRC in the DCI format is scrambled through the P-RNTI.

By configuring different SS sets at different times, the terminal device may listen to the PDCCH candidates at a corresponding PDCCH listening timing based on the SS set associated with a control-channel resource set of the PDCCH.

The terminal device may listen to the PDCCH candidates based on the capability of the terminal device. The capability of the terminal device includes the maximum value of the number of the PDCCH candidates listened to on a service cell and the maximum value of the number of non-overlap-ping CCEs. A definition of the capability of the terminal device includes two cases as followed.

Case 1: The capability of the terminal device is defined based on each time slot, such as shown in Table 1 and Table 2.

Case 2: The capability of the terminal device is defined based on each span, such as shown in Table 3 and Table 4.

For the case 1, each time slot includes one PDCCH listening timing of the terminal device. The maximum value of the number of symbols between the first symbol and the last symbol listened to by the terminal device in this listen-ing timing is 3.

For the case 2, each span corresponds to a span combi-nation (X, Y). X denotes the minimum time spacing between first symbols of two consecutive PDCCH listening timings of the terminal device, and Y denotes the maximum value of the number of the symbols between the first symbol and the last symbol listened to by the terminal device in a single PDCCH listening timing. For example, (7, 3) indicates that the minimum time spacing between the first symbols of the two consecutive PDCCH listening timings of the terminal device is 7 symbols, and the terminal device is required to at most listen to 3 symbols in the single PDCCH listening timing.

TABLE 4

| Subcarrier spacing configuration u | The maximum value of the number of the PDCCH candidates available to be listened to in each time slot on a service cell $M_{PDCCH}^{max,slot,u}$ |
|---|---|
| 0 | 44 |

TABLE 4-continued

| Subcarrier spacing configuration u | The maximum value of the number of the PDCCH candidates available to be listened to in each time slot on a service cell $M_{PDCCH}^{max,slot,u}$ |
|---|---|
| 1 | 36 |
| 2 | 22 |
| 3 | 20 |

As shown in Table 4, the maximum value of the number of the PDCCH candidates available to be listened to in each time slot on the service cell may be determined based on the subcarrier spacing configuration u.

TABLE 5

| Subcarrier spacing configuration u | The maximum value of the number of the non-overlapping CCEs available to be estimated in each time slot on a service cell $C_{PDCCH}^{max,slot,u}$ |
|---|---|
| 0 | 56 |
| 1 | 56 |
| 2 | 48 |
| 3 | 32 |

As shown in Table 5, the maximum value of the number of the non-overlapping CCEs candidates available to be estimated in each time slot on one cell may be determined based on the subcarrier spacing configuration u.

TABLE 6

| | The maximum value of the number of the PDCCH candidates available to be listened to in each span combination (X, Y) on a service cell $C_{PDCCH}^{max,(X,Y),u}$ | | |
|---|---|---|---|
| Subcarrier spacing configuration | | | |
| u | (2, 2) | (4, 3) | (7, 3) |
| 0 | 14 | 28 | 44 |
| 1 | 12 | 24 | 36 |

As shown in Table 6, the maximum value of the number of the PDCCH candidates available to be listened to in each span combination (X, Y) on the service cell may be determined based on the subcarrier spacing configuration u.

TABLE 7

| | The maximum value of the number of the non-overlapping CCEs available to be estimated in each span combination (X, Y) on a service cell $C_{PDCCH}^{max,(X,Y),u}$ | | |
|---|---|---|---|
| Subcarrier spacing configuration | | | |
| u | (2, 2) | (4, 3) | (7, 3) |
| 0 | 18 | 36 | 56 |
| 1 | 18 | 36 | 56 |

As shown in Table 7, the maximum value of the number of the non-overlapping CCEs available to be estimated in each span combination (X, Y) on the service cell may be determined based on the subcarrier spacing configuration u.

In the high frequency system, the time length occupied by each time element is shorter due to the greater subcarrier spacing. When the manner of defining a detection capability of the terminal device based on each time element or each span combination (X, Y) in the existing system is followed, each time element of the terminal device is required to estimate the channels in the CORESET and listen to the PDCCH candidates, which requires a high processing capability of the terminal device. Therefore, the related art urgently requires the wireless communication method to reduce the requirement for the processing capability of the terminal device and enhance the capability definition of the terminal device.

FIG. 2 is a schematic flowchart of a wireless communication method 200 according to some embodiments of the present disclosure. The method 200 may be performed by a first device. The first device may be the terminal device show in FIG. 1 or a network device on a sidelink. In other words, the method 200 may be performed in an uplink and a downlink, and may also be performed in the sidelink. The method 200 being performed by the first device is taken as an example to illustrate the method 200 in the following.

As shown in FIG. 2, the method 200 may include a part of or all of the following content.

At block S210, the method includes the first device listening to control-channel candidates based on a first capability. The first capability includes the maximum value of the number of the control-channel candidates listened to on the service cell and/or the maximum value of the number of non-overlapping CCEs, the first capability is defined based on a first time domain element and/or a first subcarrier spacing, and the first time domain element has a length greater than a length of a time slot corresponding to the first subcarrier spacing.

Based on the above scheme, by designing the first capability to be defined based on the first time domain element and/or the first subcarrier spacing, and the first time domain element having the length greater than the length of the time slot corresponding to the first subcarrier spacing, a capability of the first device is avoided to be defined based on the time slot, and it may be avoided to require each time slot of the first device to estimate the channels and listen to the control-channel candidates. In this way, an additional requirement for the processing capability of the first device may be avoided.

In some embodiments, the first capability includes: for the first subcarrier spacing, the maximum value of the number of the control-channel candidates listened to on the first time domain element of the service cell and/or the maximum value of the number of the non-overlapping CCEs.

For example, when the first subcarrier spacing is 480 kHz, the first time domain element has the length greater than the length of the time slot corresponding to 480 kHz.

In some embodiments, the length of the first time domain element may be equal to the length of the time slot.

For example, when the first subcarrier spacing is 480 kHz, the first time domain element may have the length equal to the time slot corresponding to the subcarrier spacing being 120 kHz.

In some embodiments, the first subcarrier spacing includes but is not limited to, 120 kHz, 240 kHz, 480 kHz, and 960 kHz.

In some embodiments, the first subcarrier spacing corresponding to the first time domain element is greater than or equal to a threshold. For example, the threshold includes but is not limited to 60 kHz.

In some embodiments, the first device on the downlink listens to the PDCCH candidates based on the first capability.

In some embodiments, the first device on the sidelink listens to the PSCCH candidates based on the first capability.

In some embodiments, the first time domain element includes N first time elements, N is predefined or configured by the network device, and N is a positive integer.

In some embodiments, the first time elements includes one of a plurality of time slots corresponding to the first subcarrier spacing, a first time slot group corresponding to the first subcarrier spacing, a plurality of symbols corresponding to the first subcarrier spacing, a first symbol group corresponding to the first subcarrier spacing, one or more time slots corresponding to a second subcarrier spacing, a first time slot group corresponding to the second subcarrier spacing, one or more symbols corresponding to the second subcarrier spacing, a first symbol group corresponding to the second subcarrier spacing, one or more subframes, subframe groups, and half frames.

In some embodiments, the second subcarrier spacing is predefined or configured by the network device.

In some embodiments, a starting position of the first time domain element is predefined or configured by the network device.

In some embodiments, the starting position of the first time domain element is predefined with reference to a wireless frame, and/or the starting position of the first time domain element is independently configured by the network device for the first device.

In some embodiments, the second subcarrier spacing may serve as a reference subcarrier spacing, such as 120 kHz.

In some embodiments, the starting position of the first time domain element or the first time domain element has an association relationship with at least one of a time slot identification, a subframe identification, and a wireless frame identification.

In some embodiments, in response to the first device being in an idle state, an inactive state, or an initial access phase, N is predefined and/or the starting position of the first time domain element is predefined.

In some embodiments, in response to the first device being in a connected state, N is configured by the network device, and/or the starting position of the first time domain element is configured by the network device.

In some embodiments, the first time domain element includes at least one listening timing, the at least one listening timing includes a first listening timing, and the first listening timing is associated with at least one SS set listened to by the first device.

In some embodiments, one listening timing includes a continuous segment of resource on the time domain.

In some embodiments, the at least one listening timing is at least one PDCCH listening timing. Correspondingly, the first listening timing is a PDCCH listening timing.

In some embodiments, the at least one listening timing is at least one PSCCH listening timing. Correspondingly, the first listening timing is a PSCCH listening timing.

In some embodiments, one listening timing may be considered to a time domain position in which the SS listened to by the first device is able to be configured.

In some embodiments, a length of the first listening timing includes M second time elements, M is predefined or configured by a network device, and M is a positive integer.

In some embodiments, a unit of M is the time slot. For example, M is one time slot.

In some embodiments, the unit of M is the symbol and M is greater than 3.

In some embodiments, the at least one listening timing includes one listening timing, and a length of the one listening timing is the M second time elements; or the at least one listening timing includes a plurality of listening timings, and a sum of lengths of the plurality of listening timings is the M second time elements.

In some embodiments, the second time elements includes one of: one or more time slot corresponding to the first subcarrier spacing, a second time slot group corresponding to the first subcarrier spacing, a plurality of symbols corresponding to the first subcarrier spacing, a second symbol group corresponding to the first subcarrier spacing, one or more time slots corresponding to a third subcarrier spacing, a second time slot group corresponding to the third subcarrier spacing, one or more symbols corresponding to the third subcarrier spacing, a second symbol group corresponding to the third subcarrier spacing, and one or more subframes.

In some embodiments, the third subcarrier spacing is predefined or configured by the network device.

In some embodiments, the third subcarrier spacing may serve as the reference subcarrier spacing, such as 120 kHz.

In some embodiments, a starting position of the first listening timing is predefined or configured by the network device.

In some embodiments, the starting position of the first listening timing is the same with the starting position of the first time domain element; and/or, the starting position of the first listening timing is independently configured by the network device for the first device.

In some embodiments, the first listening timing is associated with at least one SS set corresponding to a first SS set type and listened to by the first device.

In some embodiments, the first listening time is associated with at least one SS set corresponding to a second SS set type and listened to by the first device.

In some embodiments, the first listening timing is associated with at least one SS set corresponding to the first SS set type and listened to by the first device, the at least one listening timing further includes a second listening timing, and the second listening timing is associated with at least one SS set corresponding to the second SS set type and listened to by the first device. The first listening timing and the second listening timing include one case of: both the starting position of the first listening timing and a starting position of the second listening timing being predefined; the starting position of the first listening timing being predefined and the starting position of the second listening timing being configured by the network device; the starting position of the first listening timing being configured by the network device and the starting position of the second listening timing being predefined; and both the starting position of the first listening timing and the starting position of the second listening timing being configured by the network device.

In some embodiments, both the starting position of the first listening timing and the starting position of the second listening timing are the same with the starting position of the first time domain element.

In some embodiments, the starting position of the second listening timing is configured by the network device, and may be configured on any one of the N first time elements of the first time domain element.

In some embodiments, the at least one SS set corresponding to the first SS set type includes at least one of: the Type3-PDCCH CSS set, the USS set, and the Type 1-PDCCH CSS set configured by a specific RRC signaling; and/or the at least one SS set corresponding to the second SS set type includes at least one of: the Type0-PDCCH CSS set, the Type0A-PDCCH CSS set, the Type2-PDCCH CSS set, and the Type1-PDCCH CSS set configured by a common RRC signaling.

In some embodiments, the at least one SS set corresponding to the first SS set type includes the USS set; and/or the at least one SS set corresponding to the second SS set type includes at least one of: the Type0-PDCCH CSS set, the Type0A-PDCCH CSS set, the Type 1-PDCCH CSS set, the Type2-PDCCH CSS set, and the Type3-PDCCH CSS set.

In some embodiments, the at least one SS set corresponding to the second SS set type includes a CSS set.

In some embodiments, the at least one SS set corresponding to the second SS set type includes a SS set listened to by the terminal device at the initial access phase; or the at least one SS set corresponding to the second SS set type includes at least one of the Type0-PDCCH CSS set, the Type0A-PDCCH CSS set, the Type1-PDCCH CSS set, and the Type2-PDCCH CSS set.

In some embodiments, the first capability is defined based on (N, M, $\mu$). N denotes the number of the first time elements in the first time domain element, M denotes the number of second time elements in the first listening timing in the first time domain element, and $\mu$ denotes the first subcarrier spacing. For example, N may be 1, 2, 4, 8, 16 etc. M may be 3 symbols, one time slot, two time slots, or the like. $\mu$ may be 5 (i.e., the first subcarrier spacing being 480 kHz), 6 (i.e., the first subcarrier spacing being 960 kHz), or the like.

For example, when N is 4 and M is one time slot, the capability definition of the first device is shown in Table 8.

TABLE 8

| Subcarrier spacing configuration u | The maximum value of the number of the PDCCH candidates available to be listened to in each time domain element on a service cell $M_{PDCCH}^{max,(X,Y),u}$ |
|---|---|
| 5 | 20 |
| 6 | 10 |

As shown in Table 8, the maximum value of the number of the PDCCH candidates available to be listened to in each time domain element on the service cell may be determined based on the subcarrier spacing configuration u.

TABLE 9

| Subcarrier spacing configuration u | The maximum value of the number of the non-overlapping CCEs available to be estimated in each time domain element on a service cell $C_{PDCCH}^{max,(X,Y),u}$ |
|---|---|
| 5 | 20 |
| 6 | 10 |

As shown in Table 9, the maximum value of the number of the PDCCH candidates available to be listened to in each time domain element on the service cell may be determined based on the subcarrier spacing configuration u.

In some embodiments, the first time domain element includes a second time domain element and a third time domain element, and the second time domain element and the third time domain element include at least one case of: the number of first time elements in the second time domain element being the same with the number of first time elements in the third time domain element; the number of the first time elements in the second time domain element being different from the number of the first time elements in the third time domain element; a time domain length corresponding to the second time domain element being the same with a time domain length corresponding to the third time domain element; and the time domain length corresponding to the second time domain element being different from the time domain length corresponding to the third time domain element.

In other words, on one hand, on the one hand, time domain lengths (e.g., absolute time lengths) of the time domain elements corresponding to different subcarrier spacings may be the same. For example, a time domain element at 480 kHz includes 8 time slots, and a time domain element at 960 kHz includes 8 time slots. Alternatively, the time domain lengths (e.g., the absolute time lengths) of the time domain elements corresponding to the different subcarrier spacings may be different. For example, the time domain element at 480 kHz includes 8 time slots, and the time domain cell at 960 kHz includes 10 time slots. On the other hand, the number of time slots in the time domain elements corresponding to the different subcarrier spacings are the same. For example, the time domain elements at 480 kHz and 960 kHz both include 8 time slots. In some embodiments, the number of the time slots in the time domain elements corresponding to the different subcarrier spacings may be different. For example, the time domain element at 480 kHz includes 8 time slots, while the time domain element at 960 kHz includes 10 time slots.

In some embodiments, the first time domain element includes the second time domain element and the third time domain element, and the second time domain element and the third time domain element include at least one case of: the second time domain element corresponding to a fourth subcarrier spacing, the third time domain element corresponding to a fifth subcarrier spacing, and the fourth subcarrier spacing being different from the fifth subcarrier spacing; the second time domain element corresponding to a first control information format, the third time domain element corresponding to a second control information format, and the first control information format being different from the second control information format; the second time domain element corresponding to a first SS set configuration, the third time domain element corresponding to a second SS set configuration, and the first SS set configuration being different from the second SS set configuration; and the second time domain element corresponding to the first capability, the third time domain element corresponding to a second capability, and the first capability and the second capability having different requirements.

For example, the first time domain element includes a first time slot group and a second time slot group. The first time slot group and the second time slot group correspond to different businesses or application scenarios or terminal capabilities or subcarrier spacings or DCI formats or SS set configurations. Taking the application scenarios as an example, the first time slot group is performed in the initial access phase, while the second time slot group is performed in the connected state. Taking the UE capabilities as an example, the first time slot group corresponds to a first UE capability, while the second time slot group corresponds to a second UE capability.

In some embodiments, the method 200 may further include reporting the first capability supported by the first device.

In some embodiments, the first device supports the first capability among a plurality of capabilities. The first device reports the first capability. The first device may determine to employ which capability based on the configuration sent by a second device. For example, the UE may report supporting the first UE capability and/or supporting the second UE capability. Alternatively, when a requirement of the first UE capability is less than that of the second UE capability, the UE may report whether the first UE capability or the second UE capability is supported. When the UE reports supporting the second UE capability, the UE definitely supports the first UE capability.

In some embodiments, the method 200 may further include receiving configuration information.

The configuration information is configured to configure at least one of: the number of the first time elements in the first time domain element, the first subcarrier spacing, a starting position of the first time domain element, a second subcarrier spacing corresponding to the first time elements, the number of second time elements in a first listening timing in the first time domain element, a starting position of the first listening timing, and the third subcarrier spacing corresponding to the second time elements.

Specific embodiments of the present disclosure are described in conjunction with FIGS. 3-8 in the following.

Example 1

In this embodiment, the time domain element is determined based on the reference subcarrier spacing of 120 kHz.

FIG. 3 is an example of the time domain element according to some embodiments of the present disclosure.

As shown in FIG. 3, the length of the time domain element is the same with the length of the time slot corresponding to 120 kHz. The first time domain element at 480 kHz includes four time slots and the first time domain element at 960 kHz includes eight time slots.

For an example, the numbers of the time slots in the time domain elements are the same. That is, the first time domain element at 480 kHz includes four time slots, and the second time domain element at 960 kHz includes four time slots.

For another example, the numbers of the time slots in the time domain elements may be different. That is, the second time domain element at 480 kHz includes six time slots, and the second time domain element at 960 kHz includes 4 time slots.

Example 2

In this embodiment, the first time domain element described above may include one or more listening timings.

FIG. 4 is an example of the listening timing in the first time domain element according to some embodiments of the present disclosure.

For example, the first time domain element only includes one listening timing. The listening timing may be located on the first time slot in the first time domain element, such as the first listening timing, or located on any one of the time slots in the first time domain element, such as the second listening timing.

For another example, the first time domain element includes a plurality of listening timings, such as the first listening timing and the second listening timing shown in FIG. 4.

In some embodiments, a starting position of the listening timing is the same with a starting position of the time slot corresponding to the listening timing. For example, the first symbol of the time slot is the starting position.

In some embodiments, a gap exists between an ending position of the listening timing and an ending position of the time slot corresponding to the listening timing. For example, it ends at a penultimate symbol of the time slot. In this example, the last symbol of the time slot may be configured for beam switching.

In some embodiments, a gap exists between the starting position of the listening timing and the starting position of the time slot corresponding to the listening timing. For example, it starts from the second symbol of the time slot. In this example, the first symbol of the time slot may be configured for the beam switching.

FIG. 5 is an example of the listening timing configured with a SS according to some embodiments of the present disclosure.

As shown in FIG. 5, the first time domain element only includes one listening timing, and the SSs to be listened to by the terminal device are configured in this listening timing. The terminal device is configured with four search spaces in the first listening timing. A SS 0 is configured on symbols 0 and 1, a SS 1 is configured on symbols 3 and 4, a SS 2 is configured on symbols 6 and 7, and a SS 3 is configured on symbols 9 and 10. In this example, when at least two SSs, such as the SS 1 and the SS 2, correspond to different beams (or corresponding to different QCL types D), the symbol 5 between the SS 1 and the SS 2 may be configured for the beam switching (or the terminal device does not transmit on the symbol 5).

Figures 6, 7:
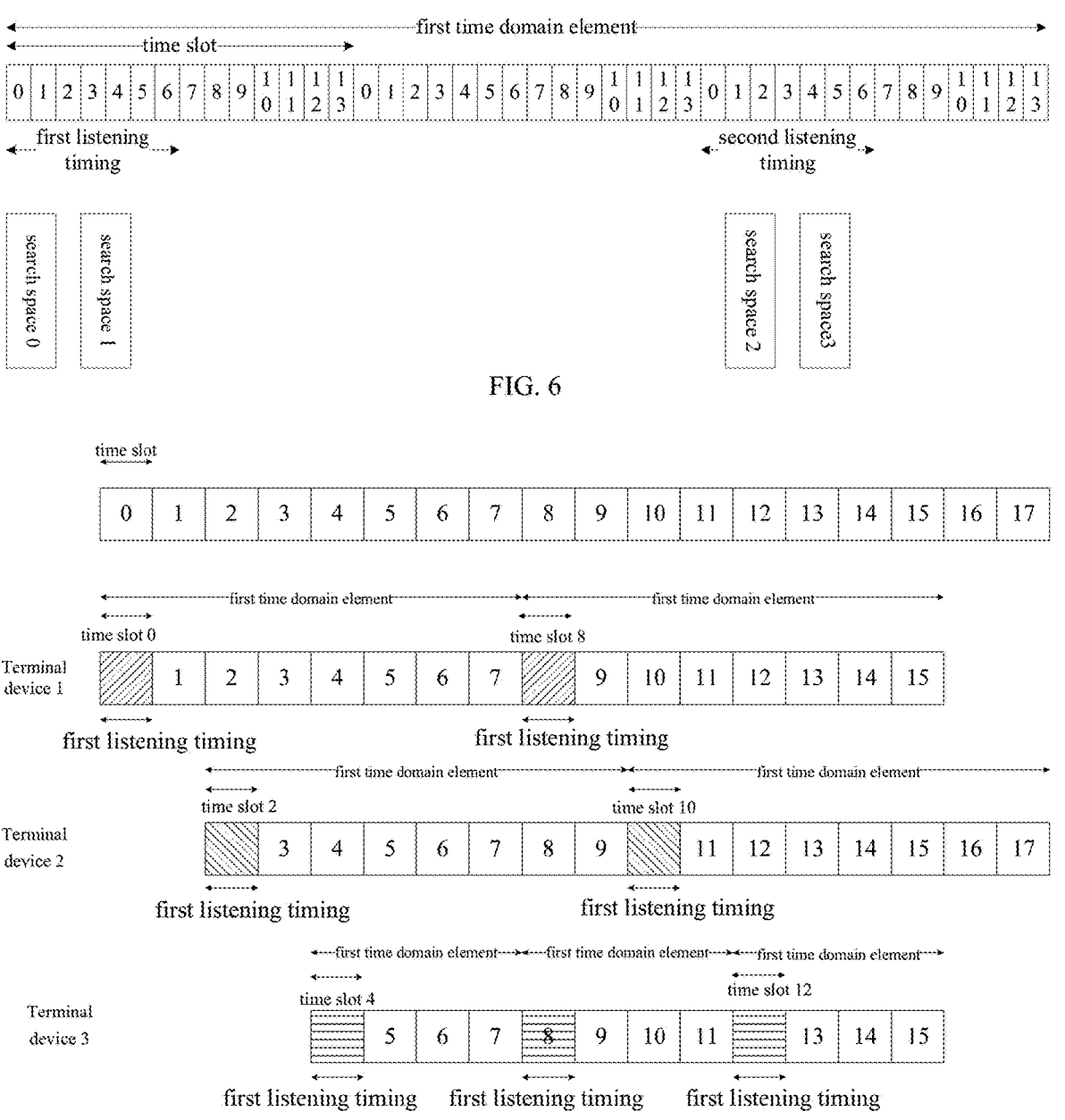
FIG. 6 is a fourth example of the time domain element according to some embodiments of the present disclosure.
FIG. 7 is a fifth example of the time domain element according to some embodiments of the present disclosure.

FIG. 6 is an example of a plurality of listening timings configured with SSs according to some embodiments of the present disclosure.

As shown in FIG. 6, the first time domain element includes the plurality of listening timings, and the SSs to be listened to by the terminal device are configured in the plurality of listening timings. The terminal device is configured with 2 SSs in the first listening timing. The SS 0 is configured on the symbols 0 and 1, and the SS 1 is configured on the symbols 3 and 4. Two SSs are configured in the second listening timing. In a corresponding time slot, the SS 2 is configured on the symbols 1 and 2, and the SS 3 is configured on the symbols 4 and 5.

Example 3

In this embodiment, the starting positions of first time domain elements and/or the lengths of the first time domain elements of different terminal devices are independently configured by the network device.

FIG. 7 is an example of a relationship between the first time domain element and the first listening timing in the first time domain element according to some embodiments of the present disclosure.

As shown in FIG. 7, when the starting position of the first listening timing in the first time domain element is predefined and the starting position of the first listening timing in the first time domain element is the same with the starting position of the first time domain element, the first time domain element of a terminal device 1 is configured from a time slot 0, the first time domain element of a terminal device 2 is configured from a time slot 2, and the first time domain element of a terminal device 3 is configured from a time slot 4. First listening timings of the terminal device 1 are located on time slots 0, 8, etc., first listening timings of terminal device 2 are located on time slots 2, 10, etc., and first listening timings of the terminal device 3 are located on time slots 4, 8, 12, etc.

Example 4

In this embodiment, when the terminal device determines that at least a part of time domain resources corresponding to a first SS in the first listening timing overlaps with at least a part of the time domain resources corresponding to a scheduled physical channel, the terminal device does not listen to the first SS. Alternatively, when the terminal device determines that at least the part of the time domain resources corresponding to the first SS in the first listening timing overlaps with at least the part of the time domain resources corresponding to the scheduled physical channel, and at least a part of frequency domain resources corresponding to the first SS overlaps with at least a part of frequency domain resources corresponding to the scheduled physical channel, the terminal device does not listen to the first SS.

FIG. 8 is an example of a principle of the terminal device listening to the SS according to some embodiments of the present disclosure.

As shown in FIG. 8, the SS sets listened to by the terminal device are configured on a time slot 0 and a time slot 4. When the terminal device receives control information in the SS set on the time slot 0, the control information schedules the terminal device to continuously receive physical channels 1 to 6 on time slots 1 to 6. In this case, the terminal device may not listen to the SS set on the time slot 4.

Some embodiments of the present disclosure are described in detail above in conjunction with the accompanying drawings. However, the present disclosure is not limited to specific details in the above embodiments. Various simple variants of the technical schemes of the present disclosure may be made within a technical conception scope of the present disclosure, which fall within the scope of the present disclosure. For example, each specific technical feature described in the above specific embodiments may be combined by any suitable means without contradiction. In order to avoid unnecessary repetition, various possible combinations are not described separately in the description. For example, various different implementations of the present disclosure may also be combined arbitrarily, and a combination which fails to contradicts the idea of the present disclosure should also be considered to be disclosed in the present disclosure.

It should also be understood that in various method embodiments of the present disclosure, a magnitude of a serial number of each process mentioned above does not imply an implementing sequence. The implementing sequence of each process is supposed to be determined by a function thereof and an inherent logic. The serial number of each process constitutes no limitation to an implementation process in the embodiments of the present disclosure. In addition, in the embodiments of the present disclosure, the terms "downlink" and "uplink" are configured to indicate transmission directions of a signal or data. The term "downlink" is configured to indicate a first direction of transmitting the signal or the data from a station node to the UE in the cell. The term "uplink" is configured to indicate a second direction of transmitting the signal or the data from the UE in the cell to the station node. For example, a "downlink signal" indicates the transmission direction of this signal is the first direction.

In the above, the wireless communication method provided in the present disclosure is described in detail in conjunction with the accompanying drawings from the perspective of the first device. The wireless communication method provided in the present disclosure will be described from the perspective of the second device in the following. It should be noted that the second device may be the network device as shown in FIG. 1, or may be a terminal device on the sidelink, which is not specifically limited herein.

FIG. 9 is a schematic flowchart of a wireless communication method 300 according to some embodiments of the present disclosure.

As shown in FIG. 9, the method 300 may include an operation at block S310.

At the block S310, the method 300 may include transmitting configuration information, wherein the configuration information is configured to configure at least one of: the number of first time elements in the first time domain element, a first subcarrier spacing corresponding to the first time domain element, a starting position of the first time domain element, a second subcarrier spacing corresponding to the first time elements, the number of second time elements in a first listening timing in the first time domain element, a starting position of the first listening timing, and a third subcarrier spacing corresponding to the second time elements.

The first time domain element and/or the first subcarrier spacing is configured to define a first capability, and the first capability includes the maximum value of the number of control-channel candidates listened to on a service cell and/or the maximum value of the number of non-overlapping CCEs.

It should be understood that relevant schemes of the method 300 may be referred to the description of relevant schemes of the method 200, which will not be repeated herein for concise description.

The method embodiments of the present disclosure are described in detail above in connection with FIGS. 1-9. Device embodiments of the present disclosure are described in detail below in connection with FIGS. 10-13.

FIG. 10 is a schematic block view of a first device 400 according to some embodiments of the present disclosure.

The first device 400 includes a processing unit 410. The processing unit 410 is configured to listen to control-channel candidates based on a first capability. The first capability includes the maximum value of the number of the control-channel candidates listened to on the service cell and/or the maximum value of the number of the non-overlapping CCEs, the first capability is defined based on the first time domain element and/or the first subcarrier spacing, and the first time domain element has the length greater than the length of the time slot corresponding to the first subcarrier spacing.

In some embodiments, the first time domain element includes N first time elements, N is predefined or configured by a network device, and N is a positive integer.

In some embodiments, the first time elements includes one of: a plurality of time slots corresponding to the first subcarrier spacing, a first time slot group corresponding to the first subcarrier spacing, a plurality of symbols corresponding to the first subcarrier spacing, a first symbol group corresponding to the first subcarrier spacing, one or more time slots corresponding to a second subcarrier spacing, a first time slot group corresponding to the second subcarrier spacing, one or more symbols corresponding to the second subcarrier spacing, a first symbol group corresponding to the second subcarrier spacing, one or more subframes, subframe groups, and half frames.

In some embodiments, the second subcarrier spacing is predefined or configured by the network device.

In some embodiments, a starting position of the first time domain element is predefined or configured by the network device.

In some embodiments, the starting position of the first time domain element is predefined with reference to a wireless frame, and/or the starting position of the first time domain element is independently configured by the network device for the first device.

In some embodiments, the starting position of the first time domain element or the first time domain element has an association relationship with at least one of a time slot identification, a subframe identification, and a wireless frame identification.

In some embodiments, in response to the first device being in an idle state, an inactive state, or an initial access phase, N is predefined and/or a starting position of the first time domain element is predefined.

In some embodiments, in response to the first device being in a connected state, N is configured by the network device, and/or a starting position of the first time domain element is configured by the network device.

In some embodiments, the first time domain element includes at least one listening timing, the at least one listening timing includes a first listening timing, and the first listening timing is associated with at least one SS set listened to by the first device.

In some embodiments, a length of the first listening timing includes M second time elements, M is predefined or configured by the network device, and M is a positive integer.

In some embodiments, the at least one listening timing includes one listening timing, and a length of the one listening timing is the M second time elements; or the at least one listening timing includes a plurality of listening timings, and a sum of lengths of the plurality of listening timings is the M second time elements.

In some embodiments, the second time elements includes one of: one or more time slot corresponding to the first subcarrier spacing, a second time slot group corresponding to the first subcarrier spacing, a plurality of symbols corresponding to the first subcarrier spacing, a second symbol group corresponding to the first subcarrier spacing, one or more time slots corresponding to a third subcarrier spacing, a second time slot group corresponding to the third subcarrier spacing, one or more symbols corresponding to the third subcarrier spacing, a second symbol group corresponding to the third subcarrier spacing, and one or more subframes.

In some embodiments, the third subcarrier spacing is predefined or configured by a network device.

In some embodiments, a starting position of the first listening timing is predefined or configured by the network device.

In some embodiments, the starting position of the first listening timing is the same with a starting position of the first time domain element; and/or, the starting position of the first listening timing is independently configured by the network device for the first device.

In some embodiments, the first listening timing is associated with at least one SS set corresponding to a first SS set type and listened to by the first device.

In some embodiments, the first listening time is associated with at least one SS set corresponding to a second SS set type and listened to by the first device.

In some embodiments, the first listening timing is associated with at least one SS set corresponding to a first SS set type and listened to by the first device, the at least one listening timing further includes a second listening timing, the second listening timing is associated with at least one SS set corresponding to a second SS set type and listened to by the first device, and the first listening timing and the second listening timing include one case of: both the starting position of the first listening timing and a starting position of the second listening timing being predefined; the starting position of the first listening timing being predefined and the starting position of the second listening timing being configured by the network device; the starting position of the first listening timing being configured by the network device and the starting position of the second listening timing being predefined; and both the starting position of the first listening timing and the starting position of the second listening timing being configured by the network device.

In some embodiments, the at least one SS set corresponding to the first SS set type includes at least one of: a Type3-PDCCH CSS set, a USS set, and a Type 1-PDCCH CSS set configured by a specific RRC signaling; and/or the at least one SS set corresponding to the second SS set type includes at least one of: a Type0-PDCCH CSS set, a Type0A-PDCCH CSS set, a Type2-PDCCH CSS set, and a Type1-PDCCH CSS set configured by a common RRC signaling.

In some embodiments, the at least one SS set corresponding to the first SS set type includes a USS set; and/or the at least one SS set corresponding to the second SS set type includes at least one of: a Type0-PDCCH CSS set, a Type0A-PDCCH CSS set, a Type1-PDCCH CSS set, a Type2-PDCCH CSS set, and a Type3-PDCCH CSS set.

In some embodiments, the first capability is defined based on $(N, M, \mu)$, N denotes the number of first time elements in the first time domain element, M denotes the number of second time elements in a first listening timing in the first time domain element, and $\mu$ denotes the first subcarrier spacing.

In some embodiments, the first subcarrier spacing includes at least one of 120 kHz, 240 kHz, 480 kHz, and 960 kHz.

In some embodiments, the first time domain element includes a second time domain element and a third time domain element, and the second time domain element and the third time domain element include at least one case of: the number of first time elements in the second time domain element being the same with the number of first time elements in the third time domain element; the number of the first time elements in the second time domain element being different from the number of the first time elements in the third time domain element; a time domain length corresponding to the second time domain element being the same with a time domain length corresponding to the third time domain element; and the time domain length corresponding to the second time domain element being different from the time domain length corresponding to the third time domain element.

In some embodiments, the first time domain element includes a second time domain element and a third time domain element, and the second time domain element and the third time domain element include at least one case of: the second time domain element corresponding to a fourth subcarrier spacing, the third time domain element corresponding to a fifth subcarrier spacing, and the fourth subcarrier spacing being different from the fifth subcarrier spacing; the second time domain element corresponding to a first control information format, the third time domain element corresponding to a second control information format, and the first control information format being different from the second control information format; the second time domain element corresponding to a first search space set configuration, the third time domain element corresponding to a second search space set configuration, and the first search space set configuration being different from the second search space set configuration; and the second time domain element corresponding to the first capability, the third time domain element corresponding to a second capability, and the first capability and the second capability having different requirements.

In some embodiments, the first device 400 may further include a communication unit. The communication unit is configured to report the first capability supported by the first device.

In some embodiments, the first device 400 may further include a communication unit. The communication unit is configured to receive configuration information.

The configuration information is configured to configure at least one of: the number of first time elements in the first time domain element, the first subcarrier spacing, a starting position of the first time domain element, a second subcarrier spacing corresponding to the first time elements, the number of second time elements in a first listening timing in the first time domain element, a starting position of the first listening timing, and the third subcarrier spacing corresponding to the second time elements.

FIG. 11 is a schematic block view of a second device 500 according to some embodiments of the present disclosure.

The second device 500 includes a communication unit 510. The processing unit 510 is configured to transmit configuration information.

The configuration information is configured to configure at least one of: the number of first time elements in the first time domain element, a first subcarrier spacing corresponding to the first time domain element, a starting position of the first time domain element, a second subcarrier spacing corresponding to the first time elements, the number of second time elements in a first listening timing in the first time domain element, a starting position of the first listening timing, and a third subcarrier spacing corresponding to the second time elements.

The first time domain element and/or the first subcarrier spacing is configured to define a first capability, and the first capability includes the maximum value of the number of control-channel candidates listened to on a service cell and/or the maximum value of the number of non-overlapping CCEs.

It should be understood that the device embodiments may correspond to the method embodiments, and similar descriptions may be referred to the method embodiments. In an embodiment, the first device 400 shown in FIG. 10 may correspondingly perform the method 200 in some embodiments of the present disclosure, and the foregoing and other operations and/or functions of various units of the first device 400 are configured to implement corresponding processes of the method in FIG. 2, respectively. Similarly, the second device 500 shown in FIG. 11 may also correspondingly perform the method 200 in some embodiments of the present disclosure, and the foregoing and other operations and/or functions of various units of the second device 500 may be also configured to implement corresponding processes of the method in FIG. 2, respectively. Repeated description is omitted herein for brevity.

The communication device in some embodiments of the present disclosure is described above in connection with the accompanying drawings from the perspective of functional modules. It should be understood that the functional modules may be implemented in a form of a hardware, or may be implemented through instructions in a form of a software, or in a form of a module combination of the hardware and the software. Each operation of the method embodiments in the embodiments of the present disclosure may be completed through an integrated logic circuit of the hardware in a processor and/or instructions in the form of the software. Operations of the method disclosed in combination with some embodiments of the present disclosure may be directly embodied to be completed by a hardware decoding processor, or completed by the module combination of the hardware and the software of the decoding processor. Alternatively, a software module may be arranged in a proven storage medium in the art, such as a random memory, a flash memory, a read-only memory, a programmable read-only memory, an electrically erasable programmable memory, a register, or the like. The storage medium is arranged in a memory. The processor reads information in the memory and completes the operations of the method embodiments described above in conjunction with the hardware thereof.

For example, the processing unit and the communication unit involved above may be implemented by the processor and a transceiver, respectively.

Figure 12:
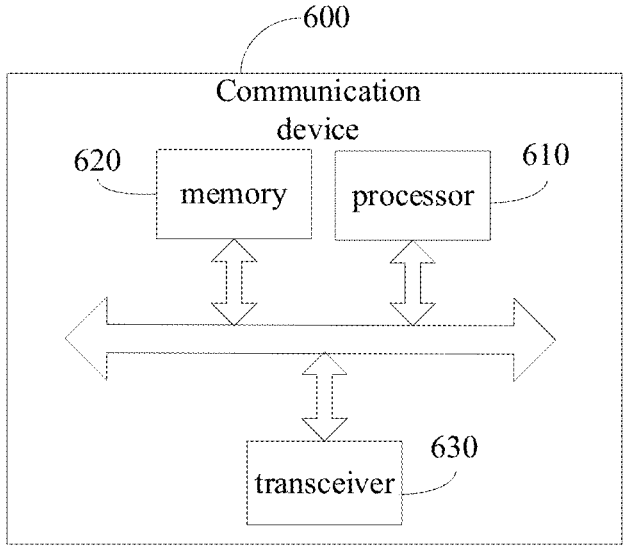
FIG. 12 is a schematic block view of a communication device according to some embodiments of the present disclosure.

FIG. 12 is a schematic structural view of a communication device 600 according to some embodiments of the present disclosure.

As shown in FIG. 12, the communication device 600 may include a processor 610.

In an embodiment, the processor 610 may call and run a computer program from the memory to implement the method in some embodiments of the present disclosure.

As shown in FIG. 12, the communication device 600 may further include a memory 620.

In an embodiment, the memory 620 may be configured to store instruction information and may also be configured to store codes, instructions, etc., executed by the processor 610. In an embodiment, the processor 610 may call and run the computer program from the memory 620 to implement the method in some embodiments of the present disclosure. The memory 620 may be a separate component independent from the processor 610 or may be integrated to the processor 610.

As shown in FIG. 12, the communication device 600 may also include a transceiver 630.

In an embodiment, the processor 610 may control the transceiver 630 to communicate with other devices. For example, the processor 610 may control the transceiver 630 to transmit information or data to other devices or receive information or data from other devices. The transceiver 630 may include a transmitter and a receiver. The transceiver 630 may further include an antenna, and the number of antennas may be one or more.

It should be understood that various components of the communication device 600 are connected via a bus system. The bus system includes a power bus, a control bus, and a status signal bus in addition to a data bus.

It should be understood that the communication device 600 may be the first device of the embodiments of the present disclosure, and may implement corresponding processes implemented by the first device of each method in the embodiments of the present disclosure. That is, the communication device 600 in some embodiments of the present disclosure may correspond to the first device 400 of the embodiments of the present disclosure and may correspondingly perform the method 200 according to some embodiments of the present disclosure, which are not repeated herein for brevity. Similarly, the communication device 600 may be the second device of the embodiments of the present disclosure, and may implement corresponding processes implemented by the second device of each method in the embodiments of the present disclosure. That is, the communication device 600 in some embodiments of the present disclosure may correspond to the second device 500 of the embodiments of the present disclosure and may correspondingly perform the method 200 according to some embodiments of the present disclosure, which are not repeated herein for brevity.

In addition, a chip is provided in some embodiments of the present disclosure.

For example, the chip may be an integrated circuit chip with a processing capability for signals and may implement or perform each method, operation, and logic block view disclosed in the embodiments of the present disclosure. The chip may also be referred to as a system-on-chip or a system-on-a-chip, etc. In an embodiment, the chip may be applied to various communication devices, such that the communication device installed with the chip may perform each method, operation, and logical block diagram disclosed in the embodiments of the present disclosure.

Figure 13:
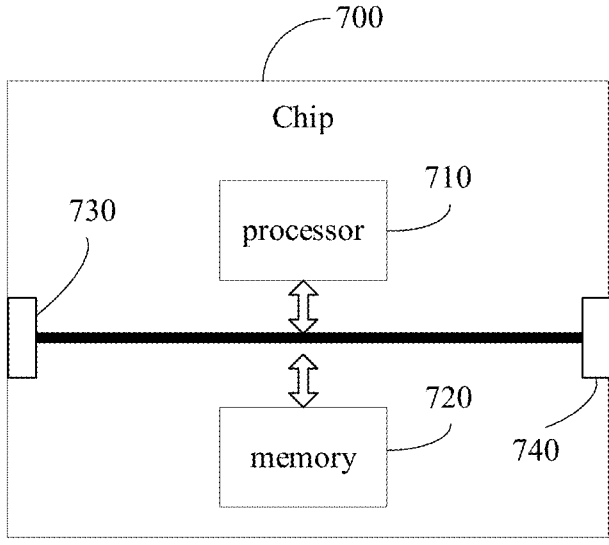
FIG. 13 is a schematic block view of a chip according to some embodiments of the present disclosure.

FIG. 13 is a schematic structural view of a chip 700 according to some embodiments of the present disclosure.

As shown in FIG. 13, the chip 700 includes a processor 710.

The processor 710 may call and run the computer program from a memory 720 to implement the method in embodiments of the present disclosure.

As shown in FIG. 13, the chip 700 may further include the memory 720.

The processor 710 may call and run the computer program from the memory 720 to implement the method in embodiments of the present disclosure. The memory 720 may be configured to store instruction information and may also be configured to store codes, instructions, etc. executed by the processor 710. The memory 720 may be a separate component independent from the processor 710, or may be integrated to the processor 710.

As shown in FIG. 13, the chip 700 may also include an input interface 730.

The processor 710 may control the input interface 730 to communicate with other devices or chips. For example, the processor 710 may control the input interface 730 to acquire information or data sent by the other devices or chips.

As shown in FIG. 13, the chip 700 may also include an output interface 740.

The processor 710 may control the output interface 740 to communicate with other devices or chips. For example, the processor 710 may control the output interface 740 to output information or data to the other devices or chips.

It should be understood that the chip 700 may be applied to the first device in the embodiments of the present disclosure. The chip 700 may implement the corresponding processes implemented by the first device of each method in the embodiments of the present disclosure, and may also implement the corresponding processes implemented by the second device of each method in the embodiments of the present disclosure, which will not be repeated herein for brevity.

It should be understood that various components in the chip 700 are connected via a bus system. The bus system includes a power bus, a control bus, and a status signal bus in addition to a data bus.

The processor involved above may include but be not limited to a general-purpose processor, a digital signal processor (DSP), an application-specific integrated circuit (ASIC), a field programmable gate array (FPGA), or other programmable logic devices, a discrete gate, or a transistor logic device, a discrete hardware component, etc.

The processor may be configured to implement or execute each method, operation, and logical block diagram disclosed in the embodiments of the present disclosure. The operations of the method disclosed in combination with some embodiments of the present disclosure may be directly embodied to be completed by the hardware decoding processor or performed, or completed by the module combination of the hardware and the software in the decoding processor. Alternatively, the software module may be arranged in the proven storage medium in the art, such as the random memory, the flash memory, the read-only memory, the programmable read-only memory, the electrically erasable programmable memory, the register, or the like. The storage medium is arranged in the memory. The processor reads the information in the memory and completes the operations of the method described above in conjunction with the hardware thereof.

The memory involved above may include but be not limited to a volatile memory and/or a non-volatile memory. The non-volatile memory may be a Read-Only Memory (ROM), a Programmable ROM (PROM), an Erasable Programmable Read-Only Memory (EPROM), an Electrically Erasable Programmable Read-Only Memory (EPROM), or a Flash Memory. The volatile memory may be a Random Access Memory (RAM), which is configured to be an external cache. By exemplary but not limiting illustration, many forms of RAM are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), and a Direct Rambus RAM (DR RAM).

It should be noted that the memory described herein is intended to include these types and any other suitable types of memories.

A non-transitory computer-readable storage medium is also provided in some embodiments of the present disclosure and configured to store a computer program. The non-transitory computer-readable storage medium stores one or more programs. The one or more programs includes instructions. When the instructions are executed by a portable electronic device including a plurality of applications, the portable electronic device is caused to implement the method in the method embodiments.

In some embodiments, the non-transitory computer-readable storage medium may be applied to the first device in some embodiments of the present disclosure. The computer program causes a computer to perform the corresponding processes implemented by the first device of each method in the embodiments of the present disclosure, which is not be repeated herein for brevity. In an embodiment, the non-transitory computer-readable storage medium may be applied to the second device in some embodiments of the present disclosure. The computer program causes the computer to perform the corresponding processes implemented by the second device of each method of the embodiments of the present disclosure, which is not repeated herein for brevity.

A computer program product is also provided in some embodiments of the present disclosure. The computer program product includes a computer program.

In an embodiment, the computer program product may be applied to the first device in some embodiments of the present disclosure. The computer program causes the computer to perform the corresponding processes implemented by the first device of each method in the embodiments of the present disclosure, which is not be repeated herein for brevity. In an embodiment, the computer program product may be applied to the second device in some embodiments of the present disclosure. The computer program causes the computer to perform the corresponding processes implemented by the second device of each method of the embodiments of the present disclosure, which is not repeated herein for brevity.

A computer program is also provided in some embodiments of the present disclosure. When the computer program is executed by the computer, the computer is caused to implement the method in the method embodiments.

In an embodiment, the computer program may be applied to the first device in some embodiments of the present disclosure. When the computer program is run in the computer, the computer is caused to perform the corresponding processes implemented by the first device of each method in the embodiments of the present disclosure, which is not be repeated herein for brevity. In an embodiment, the computer program may be applied to the second device in some embodiments of the present disclosure. When the computer program is run in the computer, the computer is caused to perform the corresponding processes implemented by the second device of each method of the embodiments of the present disclosure, which is not repeated herein for brevity.

In addition, a communication system is also provided in some embodiments of the present disclosure. The communication system may include the first device and the second device described above to form the communication system as shown in FIG. 1, which is not repeated herein for brevity. It should be noted that the term "system" or the like herein may also be referred to as "network management architecture" or "network system" or the like.

It should also be understood that the terms used in the embodiments of the present disclosure and appended claims are solely intended to describe particular embodiments but not intended to limit the embodiments of present disclosure. For example, a term in a singular form, such as "a", "the", "above" and "this" used in the embodiments of the present disclosure and the appended claims is also intended to include a plural form, unless other meanings are clearly indicated in the context otherwise.

Those skilled in the art can realize that units and algorithmic operations of each example described in conjunction with the embodiments disclosed in the description may be implemented through an electronic hardware, or a combination of a computer software and an electronic hardware. Whether these functions are performed in a manner of a hardware or in a manner of a software depends on particular applications and design constraints of the technical schemes. A professional skilled person may employ different methods to implement described functions for each particular application, but such implementation should not be considered to go beyond the scope of the embodiments of the present disclosure. When implemented in a form of a software functional unit and sold or used as an independent product, these functions may be stored in the non-transitory computer-readable storage medium. Based on such understanding, the technical schemes of the embodiments of the present disclosure essentially or a part of the technical schemes contributes to the related art or a part of the technical schemes may be embodied in a form of a software product. The software product is stored in a storage medium and includes a number of instructions to cause a computer device (e.g., a personal computer, a server, or the network device, etc.) to perform all or some of the operations of the method described in some embodiments of the present disclosure. All or some of the steps of the method described in this application. The storage medium described above includes various media capable of storing program codes, such as a USB flash drive, a removable hard drive, a read-only memory, the RAM, a disk, a CD-ROM, or the like.

Those skilled in the art may also realize that specific working processes of the systems, devices, and units described above may refer to corresponding processes in the method embodiments described above, which are not repeated herein for convenience and brevity of the description. Understandably, the systems, the devices, and methods disclosed in some embodiments of the present disclosure may be implemented in other manners. For example, a division of units or modules or components in the device embodiments described above is merely a logic function division, and other division manners may also be allowed in actual implementations. For example, multiple units or modules or components may be combined or integrated into another system, or some units or modules or components may be ignored or not implemented. For another example, the units/modules/components illustrated above as separate/display elements may be or may not be physically separated, i.e., may be located in one place or may also be distributed over a plurality of network units. Some or all of these units/modules/components may be selected according to practical needs to achieve the purpose of the embodiments of the present disclosure. Finally, it should be noted that a mutual coupling or a direct coupling or a communication connection shown or discussed above may be achieved through some interfaces, may be an indirect coupling or the communication connection between devices or units, may be electrical, mechanical or of other forms.

The above description is only specific implementations of the embodiment of the present disclosure, but the scope of the embodiments of the present disclosure is not limited thereto. Any variation or substitution easily anticipated by a person of ordinary skill within the technical scope disclosed by the embodiments of the present disclosure shall fall into the scope of the embodiments of the present disclosure. Therefore, the scope of the embodiments of the present disclosure shall be subject to the scope of the claims.

What is claimed is:

1. A wireless communication method, comprising:
listening to, by a first device, control-channel candidates based on a first capability; wherein the first capability comprises the maximum value of the number of the control-channel candidates listened to on a service cell and/or the maximum value of the number of non-overlapping control-channel elements (CCE)s, the first capability is defined based on a first time domain element and/or a first subcarrier spacing, and the first time domain element has a length greater than a length of a time slot corresponding to the first subcarrier spacing;
the first time domain element comprises N first time elements, N is predefined or configured by a network device, and N is a positive integer,
in response to the first device being in an idle state, an inactive state, or an initial access phase, N is predefined and/or a starting position of the first time domain element is predefined;
in response to the first device being in a connected state, N is configured by the network device, and/or a starting position of the first time domain element is configured by the network device.

2. The method according to claim 1, wherein the first time elements comprises one of:
a plurality of time slots corresponding to the first subcarrier spacing, a first time slot group corresponding to the first subcarrier spacing, a plurality of symbols corresponding to the first subcarrier spacing, a first symbol group corresponding to the first subcarrier spacing, one or more time slots corresponding to a second subcarrier spacing, a first time slot group corresponding to the second subcarrier spacing, one or more symbols corresponding to the second subcarrier spacing, a first symbol group corresponding to the second subcarrier spacing, one or more subframes, subframe groups, and half frames.

3. The method according to claim 1, wherein the starting position of the first time domain element is predefined with reference to a wireless frame, and/or the starting position of the first time domain element is independently configured by the network device for the first device.

4. The method according to claim 1, wherein the starting position of the first time domain element or the first time domain element has an association relationship with at least one of a time slot identification, a subframe identification, and a wireless frame identification.

5. The method according to claim 1, wherein the first time domain element comprises at least one listening timing, the at least one listening timing comprises a first listening timing, and the first listening timing is associated with at least one search space set listened to by the first device;

wherein the at least one listening timing comprises one listening timing, and a length of the one listening timing is the M second time elements; or the at least one listening timing comprises a plurality of listening timings, and a sum of lengths of the plurality of listening timings is the M second time elements;

wherein M is predefined or configured by a network device, and M is a positive integer.

6. The method according to claim 5, wherein each of the second time elements comprises one of: one or more time slot corresponding to the first subcarrier spacing, a second time slot group corresponding to the first subcarrier spacing, a plurality of symbols corresponding to the first subcarrier spacing, a second symbol group corresponding to the first subcarrier spacing, one or more time slots corresponding to a third subcarrier spacing, a second time slot group corresponding to the third subcarrier spacing, one or more symbols corresponding to the third subcarrier spacing, a second symbol group corresponding to the third subcarrier spacing, and one or more subframes.

7. The method according to claim 5, wherein the starting position of the first listening timing is the same with a starting position of the first time domain element; and/or, the starting position of the first listening timing is independently configured by the network device for the first device.

8. The method according to claim 5, wherein the first listening timing is associated with at least one search space set corresponding to a first search space set type and listened to by the first device.

9. The method according to claim 8, wherein the at least one search space set corresponding to the first search space set type comprises at least one of: a Type 3 Physical Downlink Control Channel (PDCCH) Common Search Space (CSS) (Type3-PDCCH CSS) set, a UE-specific Search Space (USS) set, and a Type 1-PDCCH CSS set configured by a specific Radio Resource Control (RRC) signaling; and/or the at least one search space set corresponding to the second search space set type comprises at least one of: a Type0-PDCCH CSS set, a Type0A-PDCCH CSS set, a Type2-PDCCH CSS set, and a Type1-PDCCH CSS set configured by a common RRC signaling.

10. The method according to claim 8, wherein the at least one search space set corresponding to the first search space set type comprises a USS set; and/or the at least one search space set corresponding to the second search space set type comprises at least one of: a Type0-PDCCH CSS set, a Type0A-PDCCH CSS set, a Type1-PDCCH CSS set, a Type2-PDCCH CSS set, and a Type3-PDCCH CSS set.

11. The method according to claim 5, wherein the first listening time is associated with at least one search space set corresponding to a second search space set type and listened to by the first device.

12. The method according to claim 5, wherein the first listening timing is associated with at least one search space set corresponding to a first search space set type and listened to by the first device, the at least one listening timing further comprises a second listening timing, the second listening timing is associated with at least one search space set corresponding to a second search space set type and listened to by the first device, and the first listening timing and the second listening timing comprise one case of:

both the starting position of the first listening timing and a starting position of the second listening timing being predefined;

the starting position of the first listening timing being predefined and the starting position of the second listening timing being configured by the network device;

the starting position of the first listening timing being configured by the network device and the starting position of the second listening timing being predefined; and both the starting position of the first listening timing and the starting position of the second listening timing being configured by the network device.

13. The method according to claim 1, wherein the first capability is defined based on (N, M, μ), N denotes the number of first time elements in the first time domain element, M denotes the number of second time elements in a first listening timing in the first time domain element, and u denotes the first subcarrier spacing.

14. The method according to claim 1, wherein the first time domain element comprises a second time domain element and a third time domain element, and the second time domain element and the third time domain element comprise at least one case of:

the number of first time elements in the second time domain element being the same with the number of first time elements in the third time domain element;

the number of the first time elements in the second time domain element being different from the number of the first time elements in the third time domain element;

a time domain length corresponding to the second time domain element being the same with a time domain length corresponding to the third time domain element; and the time domain length corresponding to the second time domain element being different from the time domain length corresponding to the third time domain element.

15. The method according to claim 1, wherein the first time domain element comprises a second time domain element and a third time domain element, and the second time domain element and the third time domain element comprise at least one case of:

the second time domain element corresponding to a fourth subcarrier spacing, the third time domain element corresponding to a fifth subcarrier spacing, and the fourth subcarrier spacing being different from the fifth subcarrier spacing;

the second time domain element corresponding to a first control information format, the third time domain element corresponding to a second control information format, and the first control information format being different from the second control information format;

the second time domain element corresponding to a first search space set configuration, the third time domain element corresponding to a second search space set configuration, and the first search space set configuration being different from the second search space set configuration; and the second time domain element corresponding to the first capability, the third time domain element corresponding to a second capability, and the first capability and the second capability having different requirements.

16. A terminal device, comprising:

a processor;

a memory, configured to store a computer program; and a transceiver;

wherein the processor is configured to call and run the computer program stored in the memory to control the transceiver to implement:

listening to control-channel candidates based on a first capability; wherein the first capability comprises the maximum value of the number of the control-channel candidates listened to on a service cell and/or the maximum value of the number of non-overlapping control-channel elements (CCE)s, the first capability is defined based on a first time domain element and/or a first subcarrier spacing, and the first time domain element has a length greater than a length of a time slot corresponding to the first subcarrier spacing;

the first time domain element comprises N first time elements, N is predefined or configured by a network device, and N is a positive integer, in response to the terminal device being in an idle state, an inactive state, or an initial access phase, N is predefined and/or a starting position of the first time domain element is predefined;

in response to the terminal device being in a connected state, N is configured by the network device, and/or a starting position of the first time domain element is configured by the network device.

17. The terminal device according to claim 16, wherein the first time elements comprises one of:

a plurality of time slots corresponding to the first subcarrier spacing, a first time slot group corresponding to the first subcarrier spacing, a plurality of symbols corresponding to the first subcarrier spacing, a first symbol group corresponding to the first subcarrier spacing, one or more time slots corresponding to a second subcarrier spacing, a first time slot group corresponding to the second subcarrier spacing, one or more symbols corresponding to the second subcarrier spacing, a first symbol group corresponding to the second subcarrier spacing, one or more subframes, subframe groups, and half frames.

18. The terminal device according to claim 16, wherein the starting position of the first time domain element is predefined with reference to a wireless frame, and/or the starting position of the first time domain element is independently configured by the network device for the terminal device.

19. The terminal device according to claim 16, wherein the starting position of the first time domain element or the first time domain element has an association relationship with at least one of a time slot identification, a subframe identification, and a wireless frame identification.

20. A network device, comprising:

a processor;

a memory, configured to store a computer program; and a transceiver;

wherein the processor is configured to call and run the computer program stored in the memory to control the transceiver to implement:

transmitting configuration information, wherein the configuration information is configured to configure at least one of:

the number of first time elements in a first time domain element, a first subcarrier spacing corresponding to the first time domain element, a starting position of the first time domain element, a second subcarrier spacing corresponding to the first time elements, the number of second time elements in a first listening timing in the first time domain element, a starting position of the first listening timing, and a third subcarrier spacing corresponding to the second time elements;

wherein the first time domain element and/or the first subcarrier spacing is configured to define a first capability, and the first capability comprises the maximum value of the number of control-channel candidates listened to on a service cell and/or the maximum value of the number of non-overlapping control-channel elements (CCE)s;

the first time domain element comprises N first time elements, N is predefined or configured by a network device, and N is a positive integer, in response to a first device being in an idle state, an inactive state, or an initial access phase, N is predefined and/or a starting position of the first time domain element is predefined;

in response to the first device being in a connected state, N is configured by the network device, and/or a starting position of the first time domain element is configured by the network device.

* * * * *